United States Patent

Fagerdahl

[11] Patent Number: 5,811,657
[45] Date of Patent: Sep. 22, 1998

[54] DEVICE FOR STATIONARY INSPECTION OF VEHICLES

[75] Inventor: Sten Fagerdahl, Orebro, Sweden

[73] Assignee: Josam Lastbilteknik AB, Sweden

[21] Appl. No.: 702,728

[22] PCT Filed: Sep. 8, 1995

[86] PCT No.: PCT/SE95/01009

§ 371 Date: Sep. 9, 1996

§ 102(e) Date: Sep. 9, 1996

[87] PCT Pub. No.: WO96/07884

PCT Pub. Date: Mar. 14, 1996

[30] Foreign Application Priority Data

Sep. 9, 1994 [SE] Sweden .................................. 9403006

[51] Int. Cl.$^6$ .................................................. G01B 5/255
[52] U.S. Cl. .................. 73/11.04; 33/203.14; 33/203.15; 33/203.18
[58] Field of Search ........................... 73/8, 11.04, 11.07, 73/11.08, 670, 117, 122, 130, 146; 33/203.12, 203.14, 203.15, 203.18, 336, 337

[56] References Cited

U.S. PATENT DOCUMENTS

| 1,981,613 | 11/1934 | Duby | 33/203.14 |
|---|---|---|---|
| 3,758,958 | 9/1973 | Jordan | 33/203.15 |
| 3,823,485 | 7/1974 | Lambrecht | 33/203.14 |
| 3,875,672 | 4/1975 | Castoe | 33/203.12 |
| 4,167,816 | 9/1979 | Jarman et al. | 33/203.12 |
| 4,897,926 | 2/1990 | Altnether et al. | 33/203.14 |
| 4,924,591 | 5/1990 | Brodu | 33/203.14 |
| 5,287,626 | 2/1994 | Reich | 33/203.14 |
| 5,386,639 | 2/1995 | Colarelli, III et al. | 33/203.14 |
| 5,471,754 | 12/1995 | Mieling | 33/203.18 |
| 5,522,139 | 6/1996 | Rossato | 33/203.12 |
| 5,604,296 | 2/1997 | Nozaki | 33/203.12 |

FOREIGN PATENT DOCUMENTS

| 0011100 | 5/1980 | European Pat. Off. . |
|---|---|---|
| 0281207 | 9/1988 | European Pat. Off. . |
| 2801855 | 7/1978 | Germany . |
| 2737661 | 3/1979 | Germany . |
| 418772 | 6/1981 | Sweden . |
| 9403773 | 2/1994 | WIPO . |

*Primary Examiner*—Richard Chilcot
*Assistant Examiner*—Eric S. McCall
*Attorney, Agent, or Firm*—Hayes, Soloway, Hennessey, Grossman & Hage, P.C.

[57] ABSTRACT

A device for inspecting any looseness and wear in the steering joints and suspension parts of vehicles has a low profile for installation onto a workshop floor, so that a vehicle can be driven onto the unit. The device comprises two generally planar plates bearing against one another. The lower plate is attached to the workshop floor, while the upper plate is rotatable mounted at one end thereof by a bearing pin fitted in the lower plate. The plates are, at their respective free ends, attached to one another by at least one hydraulic cylinder. In use, a vehicle is driven onto the device so as to locate a wheel on the top plate of the device, between the bearing pin and the longitudinal axis of the hydraulic cylinder. Rotation of the upper plate by application of force by the hydraulic cylinder imparts simultaneous displacement of the wheel on the upper plate in both the longitudinal and lateral directions relative to the vehicle.

6 Claims, 2 Drawing Sheets

DEVICE FOR STATIONARY INSPECTION OF VEHICLES

BACKGROUND OF THE INVENTION

1. Field of the Invention

This invention concerns a device for stationary inspection of steering joints and suspension parts in vehicles.

2. Description of the Prior Art

For vehicle wheel adjustment it is a requirement that steering component and suspension parts be free from looseness and play. To inspect this freedom from looseness and play the use of a 'play detector' is known, by which is meant an inspection unit designed to affect displacement movements of a vehicle wheel or pair of wheels in relation to a stationary vehicle and thereby be able to demonstrate the presence of any undesirable looseness in the connecting joints.

A known inspection unit of the type in question comprises a stand whose position is fixed in a depression in a workshop floor or similar so that an upper covering plate of the inspection unit connects to the upper side on the workshop floor. In the sunken inspection unit's stand are firmly attached in one plane two parallel steel axles on which a sledge is mounted between the axles so that it can be displaced under the influence of two hydraulic cylinders attached to the inspection unit's stand. The sledge mentioned is securely fixed to the underside of the covering plate, by means of which displacement movements can be imparted to this relative to the workshop floor in the longitudinal direction of the inspection unit.

Under the steel axles mentioned above, a sledge and hydraulic cylinders, on a second, lower plane in the control unit's stand, are firmly attached two transverse, parallel steel axles on which another steel sledge is mounted so that it can be displaced under the influence of two hydraulic cylinders. This sledge is also permanently attached to the underside of the covering plate, by means of which displacement can be imparted relative to the workshop floor in the transverse direction of the inspection unit.

In the inspection of a vehicle, the vehicle must be driven onto such a covering plate after which the vehicle is parked so that one vehicle wheel or pair of wheels takes up the central position on the covering plate of the inspection unit. Using a control unit included in the equipment for the inspection unit it is then possible to impart to the covering plate and a vehicle wheel on it or pair of wheels on them linear movements in the longitudinal and transverse directions of the vehicle so as to demonstrate any play in the connecting joints.

The known inspection unit mentioned, called the play detector, is relatively complicated and difficult to install in a workshop and, in addition, it is necessary at once to make different measurements in the longitudinal and transverse direction to be able to observe any looseness in connecting joints. This implies that such inspection units will mostly be of use in workshops for heavy vehicles.

For cars, there exist known devices for inspecting the play in vehicle steering mechanisms. Such an inspection unit for this purpose is designed with a 'turn-table' on which a vehicle wheel must be placed. The turn-table is mounted to permit rotation on a fixed support plate and can imparted in a horizontal plane in the vehicle's transverse direction limited rotative movement by means of a hydraulic cylinder or suchlike. Such inspection units are made with a raised turn-table, which requires use in pairs, with an inspection unit under each front wheel. The inspection method senses solely any play in the vehicle's steering joints and steering mechanism.

SUMMARY OF THE INVENTION

The object of this invention is to make a considerably simpler mechanism for stationary inspection of steering joints and suspension parts in a vehicle, an inspection unit that is easy to install in a workshop with bearing on the workshop floor so that vehicles can drive onto and park in position on the inspection unit's upper plane. To achieve this, the invention is characterized by a device consisting of a lower plate and an upper plate that rest against one another on the same plane, the lower plate being designed for plane attachment to the hard substrate and the upper plate being mounted so that it can rotate about a bearing pin at one end of the lower plate and so that the free ends of the plates are connected by at least one power-application component, preferably a hydraulic cylinder, which can impart to the upper plate rotative movements on the lower plate, and so that the inspection unit is designed with side-edges that permit vehicles to be driven on between the bearing pin and the longitudinal extent of the hydraulic cylinder.

With the device in accordance with this invention it is possible to demonstrate undesirable looseness and wear in connecting joints that are important for vehicles by applying rotative movements to each individual wheel or pair of wheels. In such rotation, the wheel can be imparted movements both in the longitudinal and transverse directions. By simultaneously sensing looseness and play in the wheel's longitudinal and transverse directions, the advantage is gained of being able to sense any looseness and wear in ball and socket joints, which, for example, are included in the vehicle's steering components.

Using the inspection device in accordance with this invention it is possible to inspect in a simple manner looseness and play in radial stays, spring suspensions, wheel bearings and front wheel king pins of lorries/trucks. It is advisable to make such inspections by means of visual examination of the machine elements in question and/or by manual touch.

Other distinctive characteristics of the invention are shown below in the patent claims and description of an invention design exemplifying an inspection unit. The description refers to the enclosed drawings and also illustrates examples of the inspection unit's practical use.

DESCRIPTION OF THE PREFERRED EMBODIMENTS

Figure 1:
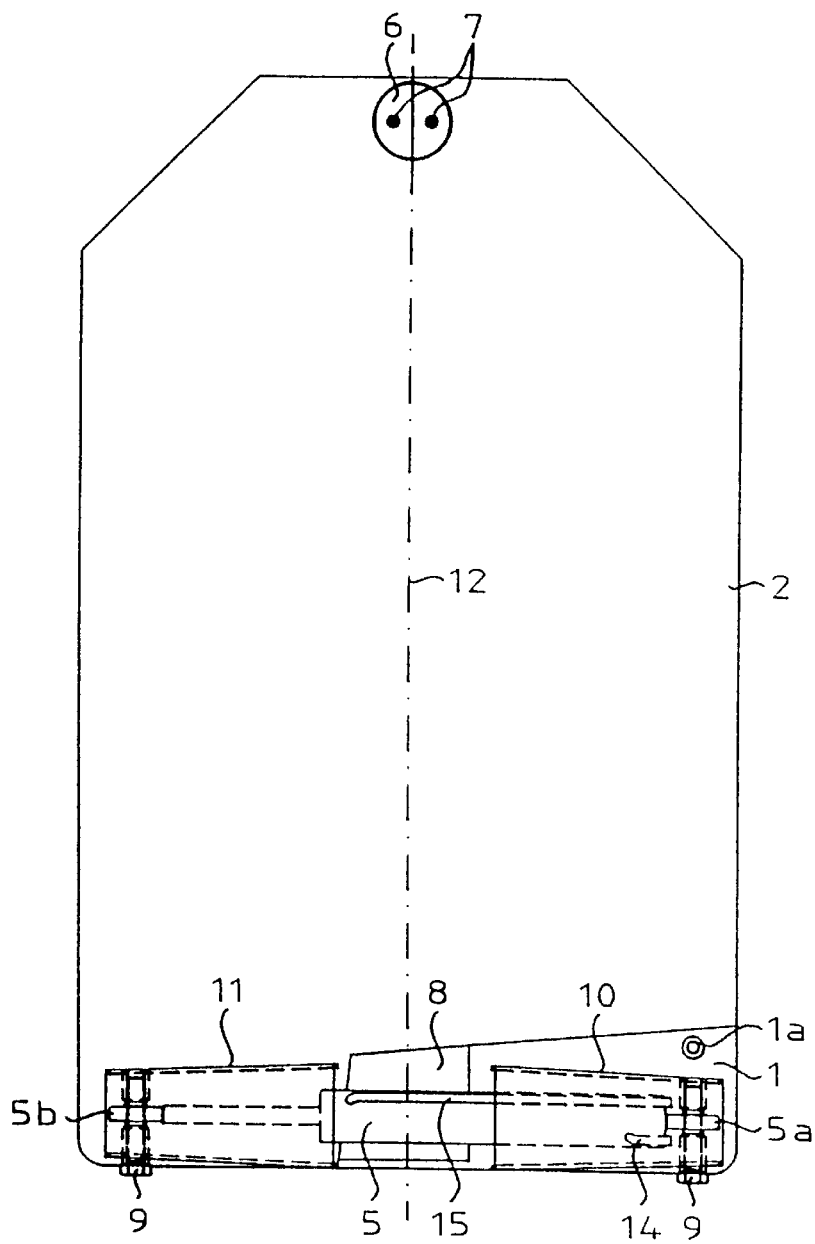
FIG. 1 shows a horizontal view of the inspection unit exemplified.
Figure 2:
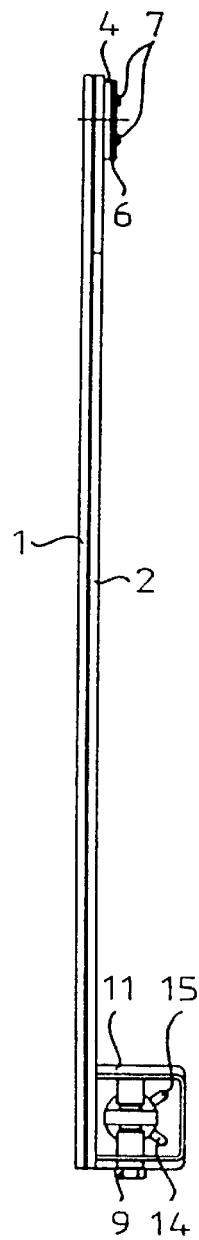
FIG. 2 shows an elevation of the inspection unit
Figure 3:
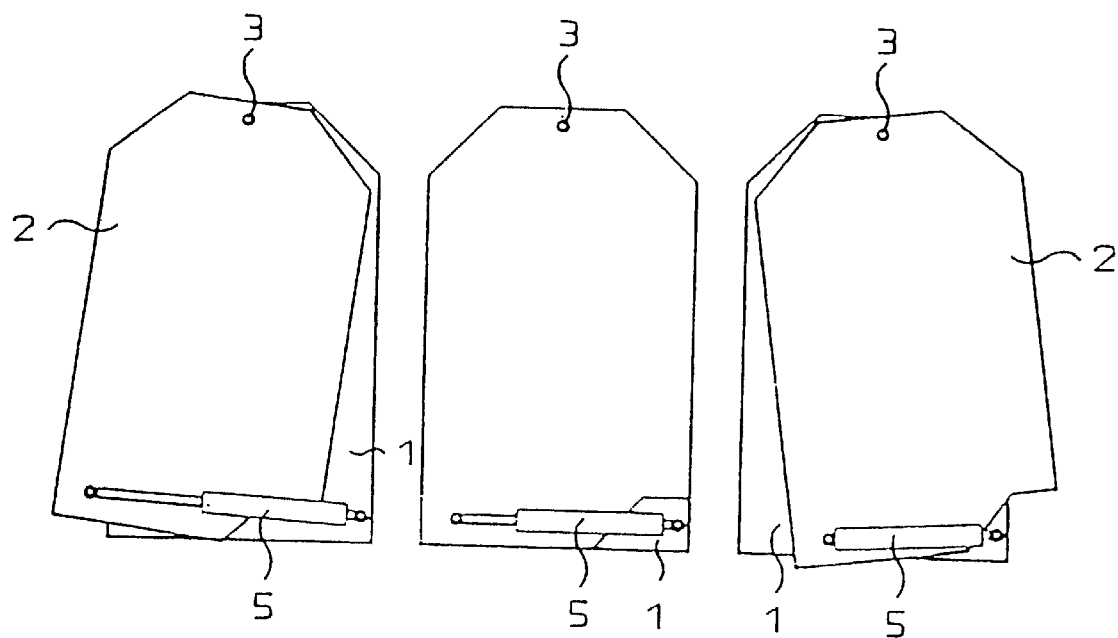
FIG. 3 shows the basic construction of the inspection unit

As shown in FIGS. 1 to 3, the inspection unit consists of two similar plane plates, a lower plate 1 and an upper plate 2 that rest one against the other on the same plane. The lower plate, 1, to be placed in a fixed position and attached to a plane substrate, such as a workshop floor, using two clamping bolts (not shown), each of which passes through its lateral hole, 1a, in the lower plate, 1. The other end of the centre line, 12, of the lower plate, 1, is equipped with a bearing pin, 3, with a hole that passes through for an expansion bolt (not shown), with which the lower plate, 1, is designed to be attached to the floor substrate.

With plane contact against the lower plate, 1, the upper plate, 2, can be rotated about the bearing pin, 3, with a bush, 4, fixed in the upper plate, 2. Such an assembled position for the two plates, 1, 2, constitutes both a pivot and attachment point for the inspection unit. A cover, 6, is attached on the bush, 4, by means of two screws.

Both the lower plate, 1, and the upper plate, 2, are at the end for the bearing centres made with bevelled edges to make the construction lighter and more flexible. Between the plates, 1, 2, the lower plate, 1, is clad with transverse strips, 8, of a friction-reducing material, preferably Robalon, to facilitate the rotative movements of the upper plate, 2, in relation to the lower plate, 1. The top of the upper plate, 2, is ribbed so that vehicle wheels when parked on the upper plate, 2, will get a better grip during vehicle inspection.

The upper plate's, 2, rotative movements about the bearing pin, 3, are achieved by a force applied by a double-acting hydraulic cylinder, 5, connected to the plates, 1, 2, at their respective free ends. To achieve this, one end of the hydraulic cylinder's piston, 5a, passes through a protective cover, 10 welded onto the lower plate, 1, and the piston end, 5a, is mounted so that it can rotate about a bearing bolt, 9. The other piston end of the hydraulic cylinder, 5b, passes through a protective cover 11 welded onto the upper plate, 2, and the piston end, 5b, is mounted to permit rotation on a bearing bolt, 9, attached to the protective cover. The protective covers, 10, 11, are each designed with a conical channel section to protect the hydraulic cylinder, 5, and facilitate circular movements of the hydraulic cylinder, 5, and to protect each protective cover, 10, 11, so that they do not collide with one another.

The piston positions of the hydraulic cylinder, 5, are regulated in the normal way by applying or dissipating hydraulic pressure to the chamber on each side of an inner piston (not shown) in the hydraulic cylinder, 5. Two pipes, 14, 15, constitute the hydraulic pressure supply and exhaust lines for the two cylinder chambers.

Figure 4:
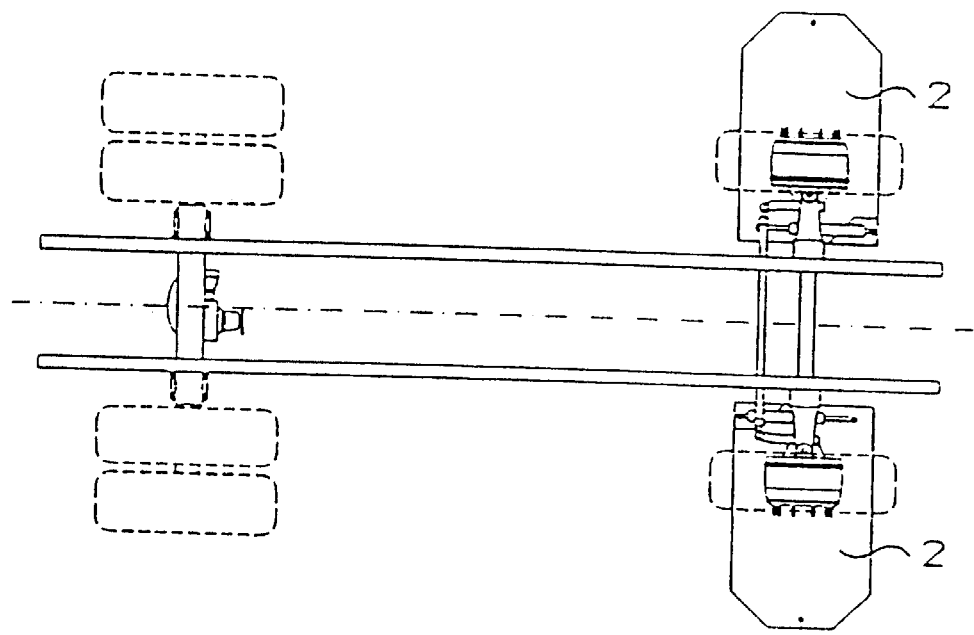
FIG. 4 shows the application of the inspection unit in the inspection of a truck.

The inspection unit in accordance with this invention can be designed with two basically rectangular plates, 1, 2. The inspection unit is simple to place and install in a workshop as it only requires attachment of the lower plate, 1, in the workshop floor using three expansion bolts or similar attachment components. It is advisable to locate the inspection unit in relation to a vehicle's longitudinal axis in accordance with FIG. 4, i.e. with the free end of the inspection unit parallel to the vehicle's longitudinal axis. It is intended that vehicles will be driven onto the inspection unit between the bearing pin, 3, and the longitudinal extent of the hydraulic cylinder, 5. It is preferable to use two inspection units as a pair for inspecting a vehicle.

When installing an inspection unit at an inspection pit, it is advisable to place the inspection unit so that its free end overhangs the edge of the inspection pit, so as not to risk the protective covers being driven over when moving the vehicle.

Installation of the inspection unit at an inspection pit is advantageous for visual examination and manual touch of the component and machine element relevant for inspection. If no looseness or play is found in the inspection, the inspected wheel will slide on the upper plate, 2, under the influence of the force applied by the hydraulic cylinder, 5.

Inspection is performed using an electrically connected control unit (not shown) which in a known way regulates a pump unit (not shown) for connecting and disconnecting hydraulic pressure to the hydraulic cylinder's respective chambers.

Within the framework of the invention concept it is also possible to perform inspection of relevant machine elements using movement-sensing electronic units, which can be designed in a known way to supply information about measurement results to a computer unit or suchlike. Irrespective of the way the information is sensed and fed out, the simplicity of the inspection unit in accordance with the invention will remain unchanged.

I claim:

1. Device for stationary inspection of steering joints and suspension parts in vehicles, which inspection device comprises a low profile unit for installation on a workshop floor, so that a vehicle wheel can be driven onto the unit, said device comprising two generally planar plates including a lower plate and an upper plate which bear against one another in the same plane, said lower plate being designed to be fixedly positioned onto the surface of the workshop floor on the same plane upon which the vehicle is driven, and wherein the upper plate is rotatably mounted about a bearing pin attached at one end to the lower plate and, wherein the upper and lower plates are joined together via at least one force-application means for imparting rotative movements to the upper plate relative to the lower plate so as to impart simultaneous displacement of the wheel on the upper plate in both longitudinal and lateral directions relative to the vehicle.

2. Device of claim 1 wherein the force-application means comprises a double-acting hydraulic cylinder.

3. Device of claim 2 wherein the hydraulic cylinder has a longitudinal axis which runs at right angle to the bearing pin.

4. Device of claim 3 wherein the plates each have a rectangular shape.

5. Device of claim 1 wherein the bearing pin on the lower plate comprises both a pivot and attachment point.

6. Device of claim 6 and further comprising a friction-reducing material between the upper and lower plates.

* * * * *

UNITED STATES PATENT AND TRADEMARK OFFICE
CERTIFICATE OF CORRECTION

PATENT NO. : 5,811,657
DATED : September 22, 1998
INVENTOR(S) : STEN FAGERDAHL

It is certified that error appears in the above-identified patent and that said Letters Patent is hereby corrected as shown below:

Claim 6, Col. 4, line 52, "Device of claim 6 and" should be --Device of claim 5 and--.

Signed and Sealed this

Third Day of August, 1999

Attest:

Q. TODD DICKINSON

Attesting Officer

Acting Commissioner of Patents and Trademarks